(12) United States Patent
Gluck et al.

(10) Patent No.: US 9,296,396 B2
(45) Date of Patent: Mar. 29, 2016

(54) MITIGATING DRIVER FATIGUE

(71) Applicant: International Business Machines Corporation, Armonk, NY (US)

(72) Inventors: Olympia Gluck, Haifa (IL); Itzhack Goldberg, Hadera (IL); Neil Sondhi, Budapest (HU); Yelena Zilberstein, Yoqneam Ilint (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/304,445

(22) Filed: Jun. 13, 2014

(65) Prior Publication Data

US 2015/0360695 A1    Dec. 17, 2015

(51) Int. Cl.
*H04M 3/42*    (2006.01)
*B60W 40/08*   (2012.01)
*H04W 4/16*    (2009.01)

(52) U.S. Cl.
CPC ............. *B60W 40/08* (2013.01); *H04W 4/16* (2013.01); *B60W 2040/0827* (2013.01)

(58) Field of Classification Search
CPC .......... H04L 29/08108; H04W 8/245; H04M 1/72519; G08B 21/06
USPC ............. 455/414.1, 550.1, 418; 340/575
See application file for complete search history.

(56) References Cited

U.S. PATENT DOCUMENTS

| | | | |
|---|---|---|---|
| 6,236,968 B1 | 5/2001 | Kanevsky et al. | |
| 6,711,474 B1 | 3/2004 | Treyz et al. | |
| 7,138,922 B2 | 11/2006 | Strumolo et al. | |
| 7,719,431 B2 | 5/2010 | Bolourchi | |
| 7,982,620 B2 | 7/2011 | Prokhorov et al. | |
| 8,022,831 B1* | 9/2011 | Wood-Eyre | 340/575 |
| 8,396,630 B2 | 3/2013 | Barnett | |
| 2003/0167167 A1 | 9/2003 | Gong | |
| 2012/0206252 A1* | 8/2012 | Sherony et al. | 340/438 |
| 2013/0335213 A1* | 12/2013 | Sherony et al. | 340/439 |
| 2014/0109080 A1* | 4/2014 | Ricci | 717/174 |
| 2014/0279707 A1* | 9/2014 | Joshua et al. | 705/400 |
| 2014/0310076 A1* | 10/2014 | Liberty et al. | 705/14.1 |
| 2015/0160019 A1* | 6/2015 | Biswal et al. | 701/1 |

OTHER PUBLICATIONS

Anonymous Inventors, "System to Limit Distracted Driving", Jul. 16, 2010, Database: IP.com, IP.com No. IPCOM000197621D.
"Euronews hi-tech-Fighting driver fatigue", Published on Jul. 7, 2011, YouTube, <http://www.youtube.com/watch?v=z0JT4KMUCM4>.
"How to Fight Fatigue While Driving", Copyright © 2014-2016: Road & Travel Magazine, <http://www.roadandtravel.com/safetyandsecurity/drivingfatigue.html>.

* cited by examiner

*Primary Examiner* — Danh Le
(74) *Attorney, Agent, or Firm* — Maeve L. McCarthy

(57) ABSTRACT

A tool for mitigating driver fatigue. The tool registers, by one or more computer processors, a profile for a driver, wherein registering the profile includes the driver in a social community. The tool receives, by one or more computer processors, a request to initiate a conversation, the request indicating the driver is suffering from driver fatigue. The tool determines, by one or more computer processors, one or more available additional drivers. The tool determines, by one or more computer processors, based, at least in part, on the registered profile, one or more strategies for mitigating driver fatigue.

17 Claims, 3 Drawing Sheets

MITIGATING DRIVER FATIGUE

BACKGROUND OF THE INVENTION

The present invention relates generally to public safety, and more particularly to mitigating driver fatigue while operating a motor vehicle.

More than twenty percent of all motor vehicle accidents are attributed to drivers' fatigue. Fatigue while operating a motor vehicle is a very real danger to both those who drive while fatigued and those that do not. Fatigue affects different people in different ways. Duration of the commute, time of day, and monotony of the route can all impact the level of fatigue experienced by a driver. Drivers often employ various tactics to combat the affects of fatigue, with some tactics proving to be more successful than others. In some instances, loud music, such as offerings from a rock band, may be enough to keep a driver alert while behind the wheel. In other instances, cold temperatures can do the trick. However, in cases of extreme exhaustion, there is no substitute for a few hours of sleep.

One proven method for keeping a driver attentive during a commute is to have a conversation with a passenger. However, it is often the case that one drives alone on their commute home from work or is traveling with a similarly fatigued passenger who is more interested in sleeping in the passenger seat than holding a conversation.

SUMMARY

Aspects of an embodiment of the present invention disclose a method, system, and computer program product for mitigating driver fatigue. The method may include registering, by one or more computer processors, a profile for a driver, wherein registering the profile includes the driver in a social community. The method may further include receiving, by one or more computer processors, a request to initiate a conversation, the request indicating the driver is suffering from driver fatigue. The method may further include determining, by one or more computer processors, one or more available additional drivers. The method may further include determining, by one or more computer processors, based, at least in part, on the registered profile, one or more strategies for mitigating driver fatigue.

DETAILED DESCRIPTION

Embodiments of the present invention recognize that driving can be extremely dangerous when a driver is exhausted. Embodiments of the present invention further recognize that the proven companion method is one of the most effective ways to mitigate driver fatigue; however, it may not always be available to all drivers.

Embodiments of the present invention provide the capability to extend the proven companion method to all drivers, including those that drive alone, by creating a social network of drivers who share a mutual interest in helping drivers mitigate fatigue while driving and are willing to communicate with other drivers battling fatigue during a commute. Embodiments of the present invention provide the capability to match available drivers interested in participating in a conversation, connect the available drivers with one another to hold a conversation, and determine strategies to stimulate fatigued drivers during their commute.

Implementation of such embodiments may take a variety of forms, and exemplary implementation details are discussed subsequently with reference to the Figures.

Figure 1:
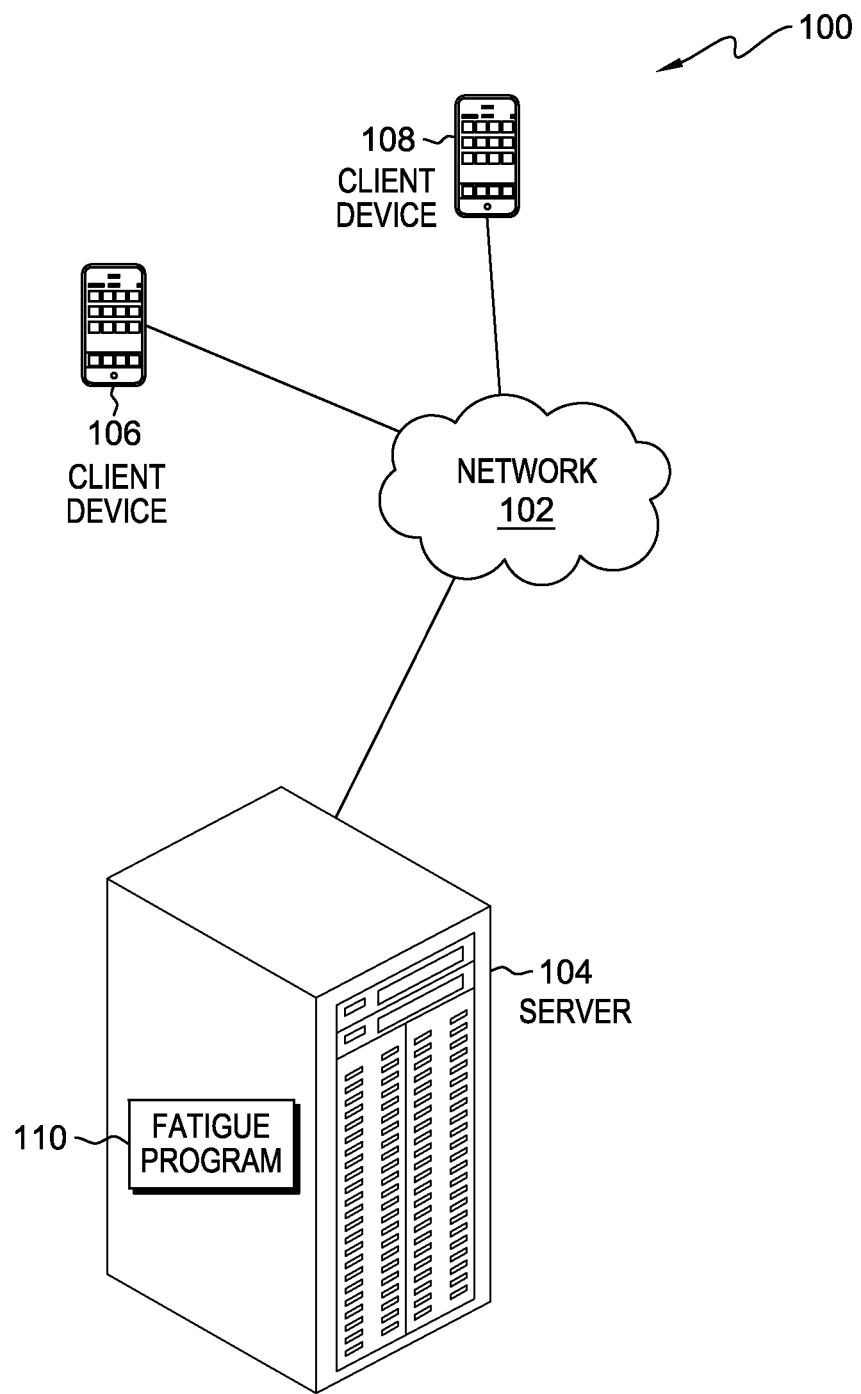
FIG. 1 is a functional block diagram illustrating a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and multiple client devices, such as client device 106 and 108.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, and client device 108 are interconnected by network 102. Network 102 can be any combination of connections and protocols capable of supporting communications between server 104, client device 106, client device 108, and fatigue program 110. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In the exemplary embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications.

In the exemplary embodiment, server 104 includes a fatigue program 110 for creating a social community of drivers interested in mitigating fatigue while operating a motor vehicle, wherein the motor vehicle can include, without limitation, an automobile, an electric car, a truck (e.g., tractor trailer), a motorcycle, a train (e.g., maglev, diesel, steam, coal, etc.), a piece of construction equipment (e.g., a crane, a backhoe, a bulldozer, a skid-steer, etc.), a watercraft, an aircraft (e.g., airplane, helicopter, hovercraft, etc.), or any other mobile machine capable of transporting passengers or cargo. In the exemplary embodiment, fatigue program 110 creates the social community by connecting a plurality of drivers to one another through profiles. Each of the drivers in the plurality of drivers maintains a profile, wherein the profiles are searchable and viewable by each of the drivers in the plurality of drivers. The social community is represented by the collection of profiles of the plurality of drivers. Through the social community, fatigue program 110 can match available drivers interested in participating in a conversation, connect the available drivers with one another to initiate a conversation, and determine strategies to effectively stimulate fatigued drivers during their commute. In the exemplary embodiment, fatigue program 110 can be based on several platforms, including, without limitation, a navigation system, such as a global positioning system (GPS), other communities, such as a travel application, which can be both a navigation system and a travel community focused on helping fellow drivers, where drivers can communicate with one another. In the exemplary embodiment, each member of the community (i.e., drivers) has a profile, including, without limitation, a name or nickname for the member, one or more languages the member speaks, one or more areas of interest (e.g., hobbies, sports, etc.), as well as topics or subjects to avoid in conversation, etc. In the exemplary embodiment, fatigue program 110 can match available drivers with one another based, at least in part, on one or more parameters, including, without limitation, information included in their profiles, geographical location, time of day, duration of their commute, proximity to additional available drivers, etc. In another embodiment, fatigue program 110 can establish a set of global ethical rules and standards by which all members of the community must adhere to. For example, fatigue program 110 may prohibit certain activities, such as using the social community to advance illicit behavior. In the exemplary embodiment, fatigue program 110 can determine strategies to effectively mitigate fatigue in drivers. For example, fatigue program 110 may suggest topics of conversation between members to help "break the ice," suggest forums or sub-groups hosting specific conversations within the community that drivers may be interested in joining, or, in the case of a driver with a long commute, determine a schedule or call list of available drivers to initiate conversation with throughout the duration of their commute.

In the exemplary embodiment, fatigue program 110 operates on a central server, such as server 104, and can be utilized by one or more client devices, such as client device 106 and client device 108, via a mobile application download from the central server or a third-party application store, and executed on the one or more client devices. In another embodiment, fatigue program 110 may be a software-based program, downloaded from a central server, such as server 104, and installed on one or more client devices, such as client device 106 and client device 108. In yet another embodiment, fatigue program 110 may be utilized as a software service provided by a third-party cloud service provider (not shown).

In the exemplary embodiment, client device 106 and client device 108 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 and client device 108 may be a mobile device capable of connecting to a network, such as network 102, to conduct a phone call, access the Internet, or utilize location services (e.g., global positioning systems).

In an alternate embodiment, client device 106 and client device 108 may be any wearable electronic device, including wearable electronic devices affixed to eyeglasses and sunglasses (e.g., Google Glass®), helmets, wristwatches, clothing, wigs, and the like, capable of sending, receiving, and processing data. For example, client device 106 and client device 108 may be a wearable electronic device, such as a wristwatch, capable of executing an application and initiating a conversation with another electronic device capable of sending and receiving data, wherein a conversation can include, without limitation, a phone conversation, a video conversation (e.g., FaceTime®), or any other suitable means of communication. In another example, client device 106 and client device 108 may be a wearable electronic device, such as a pair of eyeglasses, capable of detecting eyelid flutter rates and patterns to determine whether a driver is fatigued. In yet another embodiment, client device 106 and client device 108 may be a wearable electronic device, such as an article of clothing, capable of detecting various physiological metrics, such as blood pressure, heart rate, muscle tension, etc., to determine whether a driver is fatigued.

Figure 2:
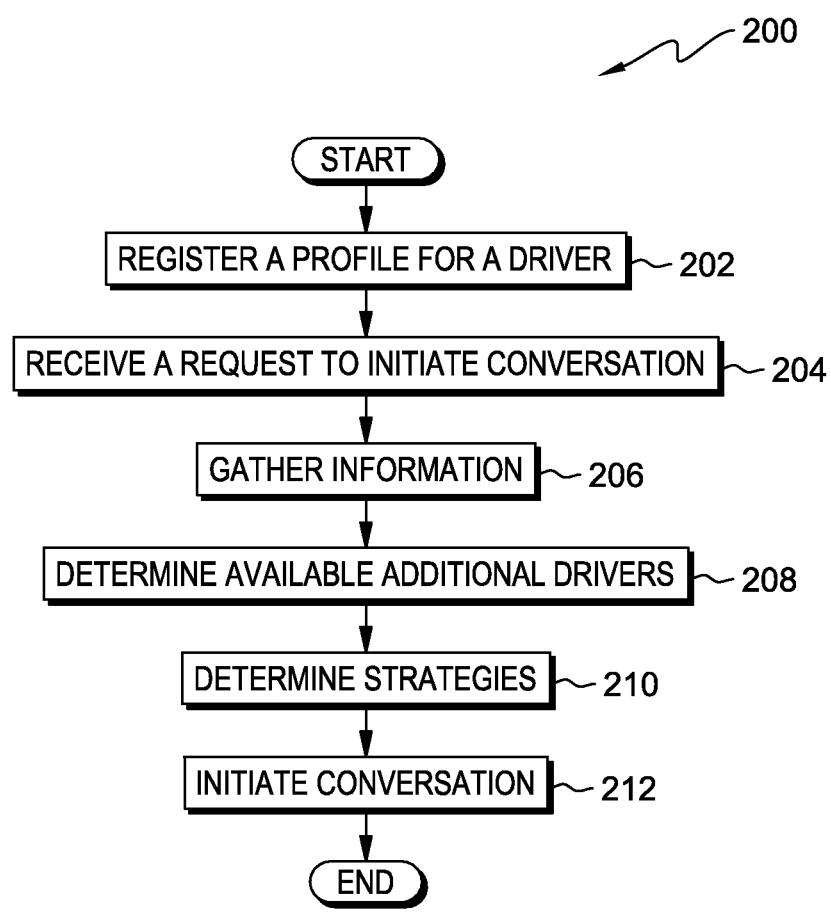
FIG. 2 is a flowchart of an exemplary process flow, generally designated 200, for mitigating driver fatigue, in accordance with an embodiment of the present invention.

FIG. 2 is a flowchart of an exemplary process flow, generally designated 200, for mitigating driver fatigue, in accordance with an embodiment of the present invention.

Fatigue program 110 registers a profile for a driver (step 202). In the exemplary embodiment, fatigue program 110 registers a profile for a driver, wherein registering the profile adds the driver to a social community for mitigating driver fatigue. The social community is made up of a plurality of drivers (i.e., members) sharing a mutual interest in mitigating driver fatigue through communication with other members, and each member of the social community has a profile. In the exemplary embodiment, fatigue program 110 registers the profile for the driver by prompting to provide preferences, including, but not limited to, personal information, a user name or nickname, an IP address, a mobile phone number, a language(s) the driver speaks, one or more hobbies or topics of interest, one or more subjects to avoid in conversation, and one or more group affiliations, etc. For example, fatigue program 110 may register a profile for a driver when the driver downloads and installs a mobile application version of fatigue program 110 on a mobile device. In this case, upon accessing the mobile application, the driver may be prompted to provide preferences, such as a name and a contact number, in order to register the profile, thereby joining the social community. In another embodiment, fatigue program 110 may prompt a driver to provide preferences related to initiating a conversation with an additional driver. For example, fatigue program 110 may prompt a driver to configure one or more features, including, but not limited to, automatically connecting the driver to an additional driver for a conversation any time a driver assistance system within the driver's vehicle determines that the driver is fatigued. In this case, the driver may randomly receive an incoming call, through a hands free, integrated phone feature of their vehicle, from an additional driver within the social community available to participate in a conversation. In another embodiment, fatigue program 110 may assign a reputation value, or a rank, to members of the social community based, at least in part, on one or more factors, including, without limitation, a level of enthusiasm in conversations, a counter of how many conversations a member has participated in, an area of expertise with respect to certain topics or subjects, and a positive or negative personality trait, etc. In yet another embodiment, fatigue program 110 may provide the capability for a member to assign a reputation value, or a rank, to one or more other members of the social community, based, at least in part, on one or more factors, including, without limitation, an aspect of a profile associated with the one or more other members, a level of enthusiasm in conversations, a counter of how many conversations a member has participated in, an area of expertise with respect to certain topics or subjects, an affiliation to one or more groups or sub communities, and a positive or negative personality trait, etc.

Fatigue program 110 receives a request to initiate a conversation (step 204). In the exemplary embodiment, fatigue program 110 receives a request to initiate a conversation, wherein the request can be a direct request, i.e., a request that originates from a driver, or an indirect request, such as a non-driver request or an automated request. In the exemplary embodiment, fatigue program 110 receives a direct request to initiate a conversation when a driver operating a motor vehicle feels the effects of fatigue setting in and submits the direct request to fatigue program 110 to initiate a conversation with an additional available driver. For example, a driver may select an "initiate conversation" button through a user interface of a corresponding mobile application on their mobile device, wherein selecting the button sends a request to fatigue program 110 to initiate a conversation. Alternatively, a driver may call a hotline number, wherein calling in to the hotline number notifies fatigue program 110 that the driver requests to initiate a conversation, and the driver may be placed on hold until fatigue program 110 processes the request (i.e., connects the driver to an additional available driver for a conversation). In an embodiment, fatigue program 110 receives an indirect request to initiate a conversation when a driver assistance system submits the indirect request to fatigue program 110 to initiate a conversation on behalf of a driver. For example, a driver assistance system in a vehicle may determine that a driver is feeling the effects of fatigue, and in response, submit a request to fatigue program 110 by accessing the driver's mobile phone via a wireless connection and virtually selecting an "initiate conversation" button through a corresponding mobile application, or dialing a hotline number, to send the request to fatigue program 110 on behalf of the driver. In another embodiment, fatigue program 110 receives an indirect request to initiate a conversation when a non-driver, such as a friend or relative of the driver, having knowledge of the driver's long commute or particular susceptibility to fatigue, sends the request on behalf of the driver via selecting a "help a driver" button on a corresponding application or dialing a hotline number to request a conversation between the driver and an available additional driver.

Fatigue program 110 gathers information (step 206). In the exemplary embodiment, in response to receiving a request to initiate a conversation, fatigue program 110 gathers information to fulfill the request to initiate a conversation, including, but not limited to, information related to a driver, a time of day, a traffic report, a location of the driver, a relative proximity to an available additional driver, and an estimated duration of the driver's commute and the available additional drivers' commutes, etc. For example, fatigue program 110 may gather information, such as a location of a driver and the driver's proximity to an available additional driver, by utilizing a global positioning system (GPS) integrated in the driver's vehicle or a location services function on the driver's mobile device. In another example, fatigue program 110 may gather information, such as an estimated duration of a driver's commute, by determining a destination, point of origin, a current route with traffic information, and an estimated speed, from a current location function on the driver's mobile device, integrated GPS in the driver's vehicle, and a driving directions website. In yet another example, fatigue program 110 may retrieve information about a driver from their social community profile, including, without limitation, one or more hobbies, one or more interests, one or more preferences, or one or more status updates, etc.

Fatigue program 110 determines available additional drivers (step 208). In the exemplary embodiment, fatigue program 110 determines one or more available additional drivers to initiate a conversation with the driver by determining a status of one or more additional drivers. Fatigue program 110 can determine the status of the one or more additional drivers by referencing the one or more additional drivers' profiles, determining a GPS location for the one or more additional drivers, and determining a time of day. For example, fatigue program 110 may determine a status of one or more additional drivers as available where the one or more additional drivers selected has designated their status on their social community profile as "active" or "available for a conversation". Alternatively, fatigue program 110 may determine a status of one or more additional drivers as unavailable where the one or more additional drivers' mobile devices are turned off (not responsive to a ping request), or a GPS location for their vehicles indicates they are home.

Fatigue program 110 determines strategies (step 210). In the exemplary embodiment, fatigue program 110 determines strategies for mitigating fatigue for the driver requesting to initiate a conversation. Fatigue program 110 determines, from the information relating to the driver, along with the information relating to one or more available additional drivers, one or more strategies for mitigating fatigue for the driver, wherein the one or more strategies including, without limitation, schedule a list of callers (i.e., available additional drivers) to ensure that the driver will have a sufficient amount of available additional drivers to talk to for the remaining time of the driver's commute, match the driver with one or more available additional drivers based, at least in part, on various aspects of the driver's and available additional drivers' social community profiles, suggest conversation topics and/or icebreakers to ease the process of holding a conversation with a stranger, and suggest a conference call or forum to join. For example, fatigue program 110 may match the driver to an available additional driver who shares a hobby or interest with the driver, as indicated by their social community profiles, or match the driver with a favorite available additional driver from a favorites list. In another example, where fatigue program 110 determines that a driver has approximately 3 hours left in their commute, fatigue program 110 may schedule a list of callers, including 6 available additional drivers who will also be traveling at some point within the next 3 hours, assuming that the driver will hold approximately a half an hour conversation with each available additional driver, thereby ensuring that the driver will have someone to talk to for the time remaining in their commute. In yet another example, fatigue program 110 may provide a driver with an option to eavesdrop on an ongoing conversation, provided the ongoing conversation has enabled eavesdropping, to allow the driver to participate at will, or stay less engaged, based on the direction of the conversation.

Fatigue program 110 initiates a conversation (step 212). In the exemplary embodiment, fatigue program 110 initiates a conversation between the driver requesting to initiate a conversation and one or more available additional drivers. Fatigue program 110 can automatically connect the driver to an available additional driver. Additionally, fatigue program 110 can prompt an available additional driver of a request to initiate a conversation and ask the available additional driver via a text message, a recorded phone message, a visual prompt, a ring tone, or the like, if the available additional driver agrees to join a conversation with the driver and connect the driver and the available additional driver upon agreement. For example, fatigue program 110 may prompt an available additional driver to agree to initiate a conversation with a driver and cycle through a list of available additional drivers until an available additional driver agrees to initiate a conversation with the driver, and upon agreement, connect the driver and the available additional driver through their respective mobile devices. In yet another example, fatigue program 110 may automatically connect a driver requesting to initiate a conversation to an in-progress conference call or forum discussing a topic of the driver's interest.

Figure 3:
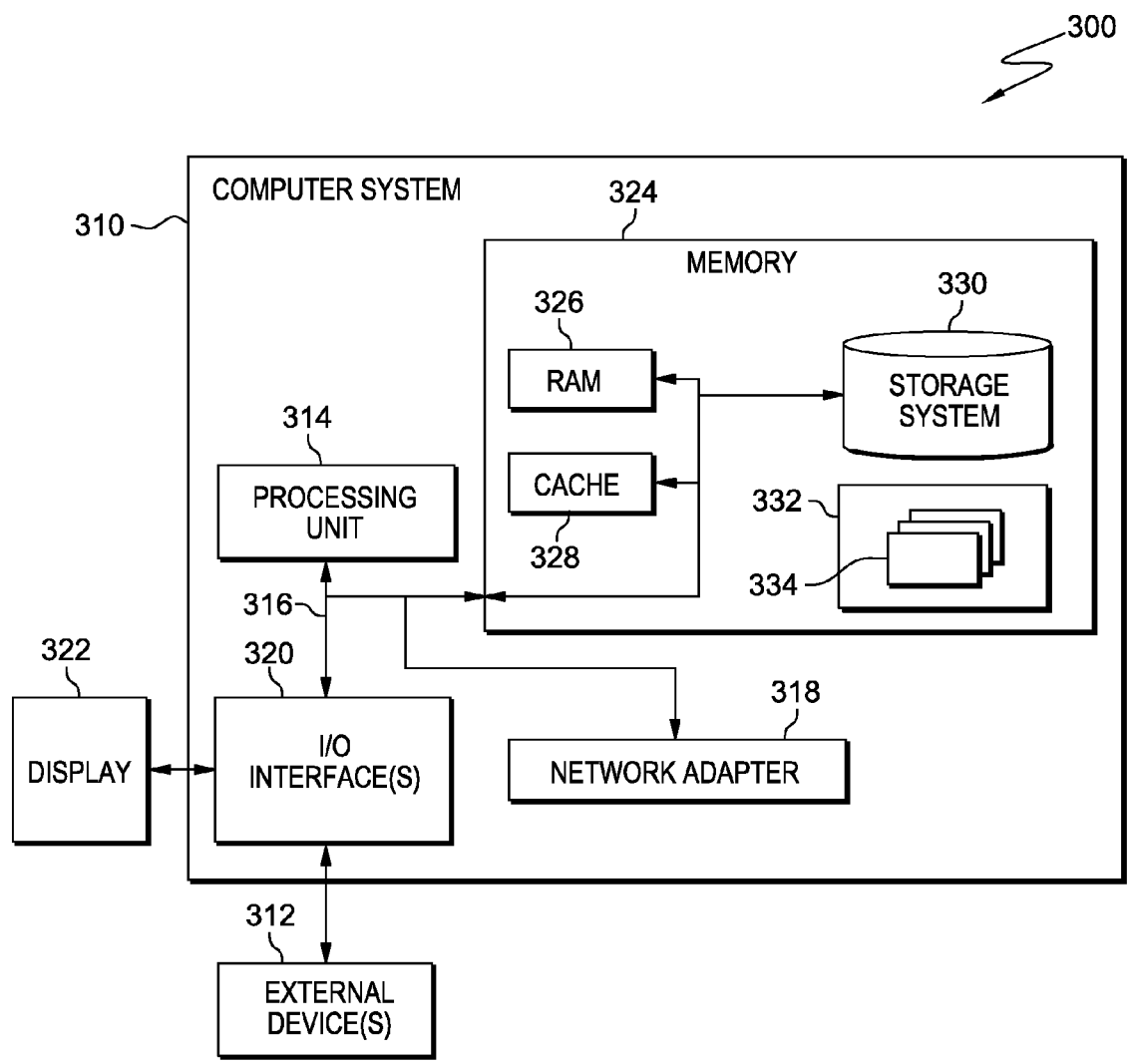
FIG. 3 is a block diagram depicting components of a data processing system (such as server 104 of FIG. 1), in accordance with an embodiment of the present invention.

FIG. 3 depicts a block diagram of components of data processing environment 100, such as server 104, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device. The components of computer system 310 may include, but are not limited to, one or more processors or processing unit 314, memory 324, and bus 316 that couples various system components including memory 324 to processing unit 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for mitigating driver fatigue, the method comprising:
    registering, by one or more computer processors, a profile for a driver, wherein registering the profile includes the driver in a social community;
    receiving, by one or more computer processors, a request to initiate a conversation, wherein the request indicates the driver is suffering from driver fatigue;
    determining, by one or more computer processors, one or more available additional drivers;
    determining, by one or more computer processors, based, at least in part, on the registered profile, two or more strategies for mitigating driver fatigue, the two or more strategies for mitigating driver fatigue including at least two of:
    matching, by one or more computer processors, the driver with the one or more available additional drivers, based, at least in part, on a plurality of aspects of the driver's profile and profiles registered by the one or more available additional drivers;
    scheduling, by one or more computer processors, a call list of the one or more available additional drivers; and
    suggesting, by one or more computer processors, at least one conversation topic.

2. The method of claim 1, further comprising:
    determining, by one or more computer processors, based, at least in part, on the two or more strategies, to initiate a conversation between the driver and the one or more available additional drivers; and
    initiating, by one or more computer processors, the conversation between the driver and the one or more available additional drivers.

3. The method of claim 2, wherein initiating a conversation between the driver and the one or more available additional drivers, further comprises one or more of the following:
    connecting, by one or more computer processors, the driver to the one or more available additional drivers automatically; and prompting, by one or more computer processors, the one or more available additional drivers to agree to join a conversation.

4. The method of claim 1, wherein registering a profile for a driver, further comprises prompting the driver to provide preferences, including, but not limited to, one or more of the following:
- a user name;
- an IP address;
- a mobile phone number;
- a language preference;
- one or more features related to initiating a conversation; and
- one or more subjects to avoid in a conversation.

5. The method of claim 1, wherein receiving a request to initiate a conversation, further comprises receiving one or more of:
- a direct request to initiate a conversation, wherein the direct request to initiate the conversation originates with the driver; and
- an indirect request to initiate a conversation, wherein the indirect request to initiate the conversation originates with a non-driver request.

6. The method of claim 1 further comprises gathering information to fulfill the request to initiate a conversation, wherein the information includes one or more of the following:
- information related to the driver;
- a time of day;
- a estimated duration of the driver's commute;
- a location of the driver;
- a traffic report; and
- a proximity of the driver to the one or more available additional drivers.

7. The method of claim 1, wherein determining one or more available additional drivers, further comprises determining a status of one or more additional drivers in the social community as available, wherein determining the status of the one or more additional drivers as available includes referencing one or more of:
- the one or more additional drivers' profiles;
- a GPS location for the one or more additional drivers; and
- a time of day.

8. A computer program product for mitigating driver fatigue, the computer program product comprising:
- one or more non-transitory computer readable storage media and program instructions stored on the one or more computer readable storage media, the program instructions comprising:
- program instructions to register, by one or more computer processors, a profile for a driver, wherein registering the profile includes the driver in a social community;
- program instructions to receive, by one or more computer processors, a request to initiate a conversation, wherein the request indicates the driver is suffering from driver fatigue;
- program instructions to determine, by one or more computer processors, one or more available additional drivers;
- program instructions to determine, by one or more computer processors, based, at least in part, on the registered profile, two or more strategies for mitigating driver fatigue, the two or more strategies for mitigating driver fatigue including at least two of:
- program instructions to match, by one or more non-transitory computer processors, the driver with the one or more available additional drivers, based, at least in part, on a plurality of aspects of the driver's profile and profiles registered by the one or more available additional drivers;
- program instructions to schedule, by one or more computer processors, a call list of the one or more available additional drivers; and
- program instructions to suggest, by one or more computer processors, at least one conversation topic.

9. The computer program product of claim 8, further comprising:
- program instructions to determine, by one or more computer processors, based, at least in part, on the two or more strategies, to initiate a conversation between the driver and the one or more available additional drivers; and
- program instructions to initiate, by one or more computer processors, the conversation between the driver and the one or more available additional drivers.

10. The computer program product of claim 9, wherein program instructions to initiate a conversation between the driver and the one or more available additional drivers, further comprise one or more of the following:
- program instructions to connect, by one or more computer processors, the driver to the one or more available additional drivers automatically; and
- program instructions to prompt, by one or more computer processors, the one or more available additional drivers to agree to join a conversation.

11. The computer program product of claim 8, wherein program instructions to register a profile for a driver, further comprise prompting the driver to provide preferences, including, but not limited to, one or more of the following:
- a user name;
- an IP address;
- a mobile phone number;
- a language preference;
- one or more features related to initiating a conversation; and
- one or more subjects to avoid in a conversation.

12. The computer program product of claim 8, wherein program instructions to receive a request to initiate a conversation, further comprise receiving one or more of:
- a direct request to initiate a conversation, wherein the direct request to initiate the conversation originates with the driver; and
- an indirect request to initiate a conversation, wherein the indirect request to initiate the conversation originates with a non-driver request.

13. The computer program product of claim 8 further comprises program instructions to gather information to fulfill the request to initiate a conversation, wherein the information includes one or more of the following:
- information related to the driver;
- a time of day;
- a estimated duration of the driver's commute;
- a location of the driver;
- a traffic report; and
- a proximity of the driver to the one or more available additional drivers.

14. The computer program product of claim 8, wherein program instructions to determine one or more available additional drivers, further comprise program instructions to determine a status of one or more additional drivers in the social community as available, wherein determining the status of the one or more additional drivers as available includes referencing one or more of:
- the one or more additional drivers' profiles;

a GPS location for the one or more additional drivers; and a time of day.

15. A computer system for mitigating driver fatigue, the computer system comprising:
  one or more computer readable storage media;
  program instructions stored on at least one of the one or more computer readable storage media for execution by at least one of the one or more computer processors, the program instructions comprising:
  program instructions to register, by one or more computer processors, a profile for a driver, wherein registering the profile includes the driver in a social community;
  program instructions to receive, by one or more computer processors, a request to initiate a conversation, wherein the request indicates the driver is suffering from driver fatigue;
  program instructions to determine, by one or more computer processors, one or more available additional drivers;
  program instructions to determine, by one or more computer processors, based, at least in part, on the registered profile, two or more strategies for mitigating driver fatigue, the two or more strategies for mitigating driver fatigue including at least two of:
  program instructions to match, by one or more computer processors, the driver with the one or more available additional drivers, based, at least in part, on a plurality of aspects of the driver's profile and profiles registered by the one or more available additional drivers;
  program instructions to schedule, by one or more computer processors, a call list of the one or more available additional drivers; and
  program instructions to suggest, by one or more computer processors, at least one conversation topic.

16. The computer system of claim 15, further comprising:
  program instructions to determine, by one or more computer processors, based, at least in part, on the two or more strategies, to initiate a conversation between the driver and the one or more available additional drivers; and
  program instructions to initiate, by one or more computer processors, the conversation between the driver and the one or more available additional drivers.

17. The computer system of claim 16, wherein program instructions to initiate a conversation between the driver and the one or more available additional drivers, further comprise one or more of the following:
  program instructions to connect, by one or more computer processors, the driver to the one or more available additional drivers automatically; and
  program instructions to prompt, by one or more computer processors, the one or more available additional drivers to agree to join a conversation.

* * * * *